United States Patent [19]

Bridge

[11] 4,027,453
[45] June 7, 1977

[54] JOINT CONSTRUCTION FOR CONNECTING TOGETHER TWO FRAME MEMBERS

[75] Inventor: Donald John Henry Bridge, Birmingham, England

[73] Assignee: Finspa Engineering Co. Limited, West Bromwich, England

[22] Filed: Oct. 9, 1973

[21] Appl. No.: 404,588

[30] Foreign Application Priority Data

Nov. 23, 1972 United Kingdom ............ 54276/72

[52] U.S. Cl. .............................. 403/353; 211/186; 211/189; 403/253; 211/207

[51] Int. Cl.² ...................... A47F 5/10; F16B 2/00

[58] Field of Search .............. 52/732, 758 G, 754, 52/757, 721, 758 R; 248/243; 211/176, 148, 177, 182; 403/191

[56] References Cited

UNITED STATES PATENTS

| | | | |
|---|---|---|---|
| 2,639,042 | 5/1953 | Lambert et al. ............... | 211/182 X |
| 2,925,920 | 2/1960 | Skubic ............................ | 211/148 X |
| 3,095,975 | 7/1963 | Cassel et al. ................... | 211/148 |
| 3,151,745 | 10/1964 | Reilly ............................. | 211/148 |
| 3,159,437 | 12/1964 | Jentzen .......................... | 211/148 X |
| 3,195,735 | 7/1965 | Jay ................................. | 211/148 |
| 3,263,821 | 8/1966 | Klene et al. .................... | 211/148 |
| 3,352,584 | 11/1967 | Engel ............................. | 211/148 X |
| 3,494,480 | 2/1970 | Cassel ............................ | 211/176 |
| 3,507,400 | 4/1970 | Barbaro ......................... | 211/176 |
| 3,510,010 | 5/1970 | Gasner ........................... | 52/754 |
| 3,561,609 | 2/1971 | Doherty ......................... | 211/182 |
| 3,575,299 | 4/1971 | O'Delte .......................... | 211/176 |
| 3,606,027 | 9/1971 | Clements ....................... | 211/176 |
| 3,625,372 | 12/1971 | Mackenzie ..................... | 211/148 X |

FOREIGN PATENTS OR APPLICATIONS

| | | | |
|---|---|---|---|
| 1,379,043 | 10/1964 | France ........................... | 211/182 |
| 1,554,279 | 4/1969 | Germany ....................... | 211/176 |
| 6,402,199 | 9/1964 | Netherlands .................. | 211/177 |
| 1,226,326 | 3/1971 | United Kingdom ........... | 211/176 |

*Primary Examiner*—Leslie Braun
*Attorney, Agent, or Firm*—Lowe, King, Price & Markva

[57] ABSTRACT

A joint construction for connecting together two members, one of the members having opposed side limbs connected by a base defining a trough-like shape, the base having formed therein a re-entrant trough-shaped recess extending longitudinally of the member, the base of re-entrant trough-shaped recess having a plurality of slots adapted to receive hook-shaped tongue elements provided on the other of said members said other member also being of trough-shape and is in contact with the substantial part of said one member when engaged therewith.

2 Claims, 4 Drawing Figures

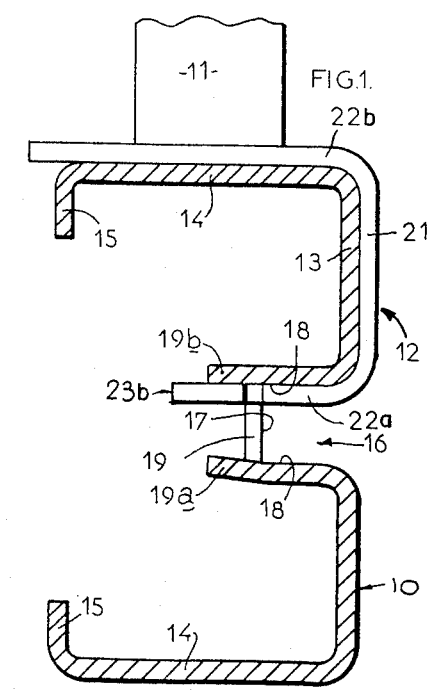
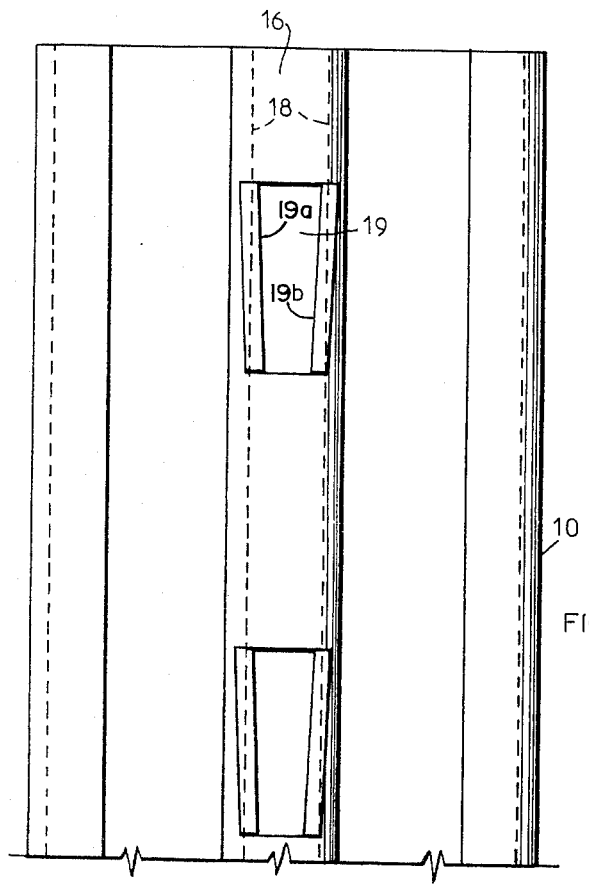
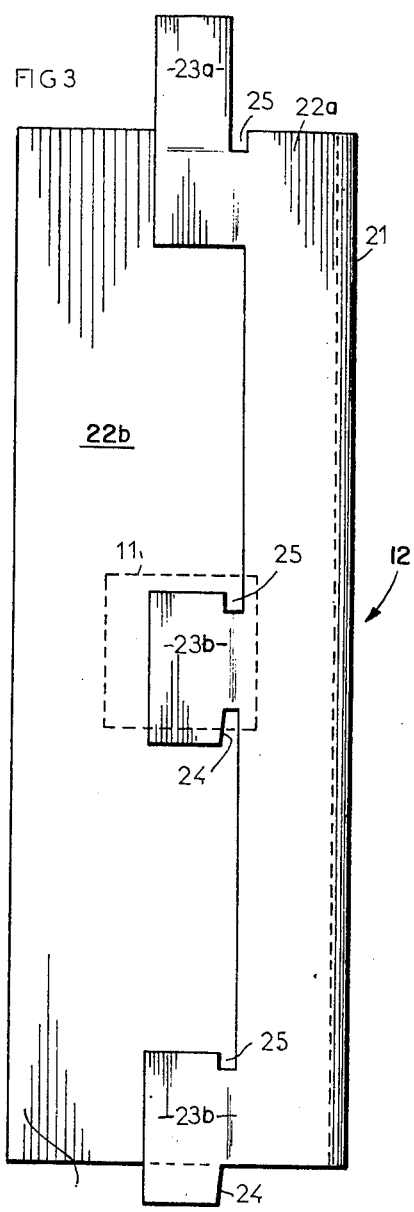

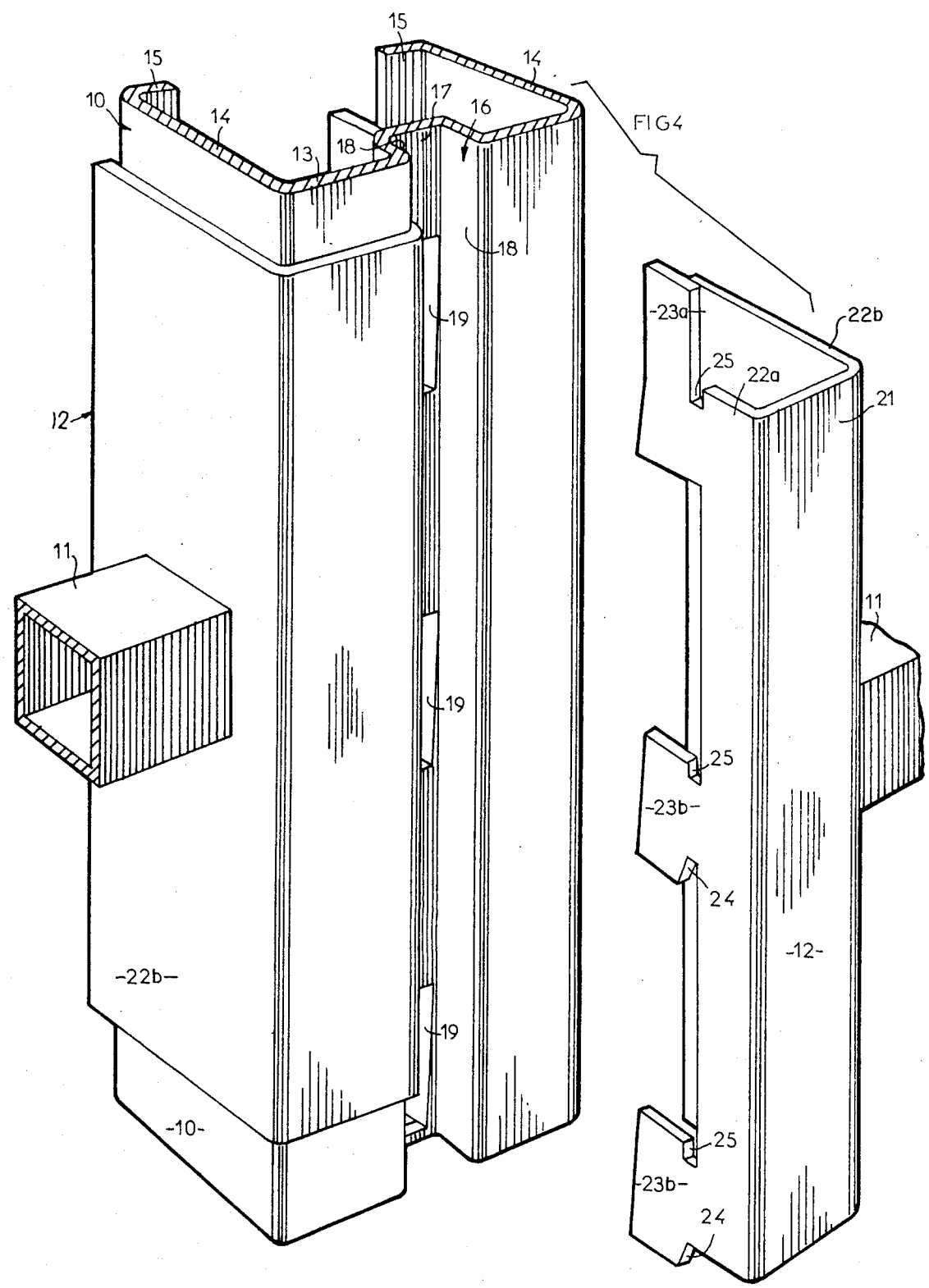

JOINT CONSTRUCTION FOR CONNECTING TOGETHER TWO FRAME MEMBERS

This invention relates to a joint construction for connecting together two members.

A joint construction in accordance with the present invention is especially suitable for use in constructing adjustable pallet rack assemblies, but it can also be used in the construction of other rack assemblies or in other applications in which it is desired to releasably and rigidly secure together frames or other members. It should be appreciated that joint construction of the present invention may be used to connect together other members which are not frame members, and that the term "member" is used herein to refer to frame members and other members.

SUMMARY OF THE INVENTION

According to the present invention there is provided a joint construction for connecting together two frame members wherein a first of said members has opposite side limbs defining a trough-like shape. The base has formed therein a re-entrant trough-shaped recess which extends longitudinally of the member. The base of the re-entrant trough-shaped recess has a plurality of slots spaced longitudinally thereof. Contact elements are disposed at margins of the slots and projecting from the base of the re-entrant trough-shaped recess in a direction away from a mouth of the re-entrant trough-shaped recess. The second of said frame members has a trough shape and a limb which comprises a plurality of hook-shaped tongue elements spaced longitudinally from one another. One of said tongue elements is is hook-shaped in the opposite direction to another of said tongue elements. The arrangement is such that the inner surface of the trough-shaped second member, in use, embraces the outer surface of one side limb and part of the base of the first member and one side of the re-entrant through-shaped recess formed therein. The tongue elements are engaged in said slots and at least one of the tongue elements is in face-to-face contact with a respective one of said contact elements.

One advantage of this arrangement is that the contact elements present for contact with the tongue elements a surface which has a substantial area. Accordingly, the maximum contact pressure which arises in use at the inter-face between the tongue elements and contact elements is not so great that these elements are deformed.

In the preferred construction, the lateral margins of the slots are mutually inclined so that each slot is wider at one end, the upper end when the first member is an upright, then at the other end thereof, the contact elements are similarly mutually inclined, and the tongue elements of the second member are inclined to the longitudinal axis of the second member so that in use, although the tongue elements and contact elements co-operate with a wedging action, contact is established over a substantial part of the surface area of each tongue element which is presented towards a corresponding contact element.

BRIEF DESCRIPTION OF THE DRAWINGS

A preferred embodiment of the invention will now be described by way of example with reference to the accompanying drawings, wherein:

FIG. 1 is a diagrammatic fragmentary plan view, partly in section, of a joint construction according to the invention in its assembled position, FIG. 2 is a diagrammatic fragmentary rear elevation of a first frame member of the joint construction shown in FIG. 1, FIG. 3 is a diagrammatic fragmentary side elevation of a second frame member of the joint construction shown in FIG. 1, and FIG. 4 is a diagrammatic fragmentary perspective view of a joint construction comprising the first frame member shown in FIG. 2, a second frame member as shown in FIG. 3 ready for assembly with the first frame member, and a further second frame member assembled with the first frame member.

DESCRIPTION OF THE PREFERRED EMBODIMENT

The example of a joint construction which is illustrated in the accompanying drawings is provided in a frame assembly of an adjustable pallet rack assembly.

The pallet rack assembly comprises a plurality of upright first frame members indicated generally at 10 in FIGS. 1, 2 and 4 and a plurality of horizontal beams indicated generally at 11 in FIGS. 1, 3 and 4.

At each end of each beam 11 is fixed a second frame member 12 which is adapted to engage with a first frame member as shown in FIGS. 1 and 4 to secure the beams 11 to the upright frame members 10.

Each first frame member 10 comprises spaced parallel side limbs 14 connected by a base 13, the side limbs and base collectively defining a trough-like shape when viewed along a longitudinal axis of the member. As shown at 15, the free ends of the side limbs 14 may be turned inwardly.

A re-entrant trough-shaped recess 16 which is of U-shape in transverse cross-section is formed in the base 13 of the first frame member 10 and extends longitudinally of this member. The re-entrant recess 16 comprises a base 17 and a pair of spaced parallel limbs 18.

A plurality of slots 19 which are spaced apart longitudinally of the first frame member 10 are formed in the base 17 of the re-entrant recess 16. These slots are formed by a plugging operation which displaces material from each slot to form a pair of contact elements 19a, 19b which are disposed at opposite lateral margins of the slot 19 and project from the base 17 of the re-entrant recess 16 in a direction away from a mouth of the re-entrant recess 16 and towards the inturned free ends 15 of the limbs 14. Opposite lateral margins of each of the slots 19 are mutually convergent, the slots being wider at their upper ends. The contact elements 19a and 19b are similarly mutually convergent in the downward direction.

The second frame members 12 are also of a trough-shaped configuration, comprising a base part 21 and a pair of spaced parallel limbs 22a, and 22b one of the limbs 22a being of shorter length than the other limb 22b and having three hook-shaped tongue elements 23a and 23b formed thereon.

The two lowermost tongue elements 23b are hook-shaped in a downwardly facing direction and have an inclined surface 24 which is inclined at an angle of 5° to the longitudinal axis of the second frame member 12. The uppermost tongue element 23a is hook-shaped in an upwardly facing direction and has no hook-shaped configuration in a downwardly facing direction. The tongue elements 23a and 23b each have a shallow recess 25 formed in their upper surfaces for a purpose hereinafter described.

The tongue elements 23a, and 23b excepting for the upwardly projecting part of that tongue element 23a which is hook-shaped in the upward direction, are inclined to the longitudinal axis of the second frame member 12 and to the remainder of the limb 22a on which they are formed. The angle of inclination of the tongue elements is equal to that angle at which the contact elements 19a and 19b are inclined to the longitudinal axis of the first frame member 10. The tongue elements diverge downwardly from the opposite limb 22b of the second frame member 12 on which they are formed.

During assembly of a plurality of first frame members 10, beams 11 and second frame members 12, the first frame members are positioned as uprights at appropriate intervals, and the positions for the beams 11 are decided upon. Each beam 11 is then held in a horizontal plane and twisted about its longitudinal axis so that the uppermost tongue elements 23a, which are of a height slightly greater, for example ¼ inch greater, than the length of the slots 19 can be inserted into a desired pair of slots in two adjacent first frame members 10. When the upper ends of the uppermost tongue elements 23a have passed through the slots 19, the beam 11 is twisted back to its original position, so that the lower tongue elements 23b are engaged in their appropriate slots in the first frame members 10. The beam 11 is then moved downwardly so that the contact elements 19a and 19b and the tongue elements 23a and 23b are brought into face-to-face engagement. In consequence of the inclination of the contact elements and tongue elements to the longitudinal axis of the first frame member, the contact elements and tongue elements engage with a wedging action and draw the second frame member 12 laterally inwardly relative to the first frame member until that limb 22a of the second frame member 12 to which the beam 11 is secured is pressed tightly against a corresponding side limb 14 of the first frame member 10. The frame members 10 and 12 are thus held tightly together.

The arrangement is such that the tongue elements 23a and 23b are not supported against downward movement relative to the first frame member 10 by engagement with the lower edges of the slots 19, although the inclined faces 24 of the tongue elements 23b would normally engage with the lower edges of the slots and co-operate therewith with a wedging action to draw the base 21 of the second frame member 12 against a corresponding part of the base 13 of the first frame member 10. In use, at least a major part of the downward loading of the beams 11 is transmitted from the second frame members 12 to the first frame members 10 at the interface between the tongue elements 23a and 23b and the contact elements 19a, 19b.

Preferably, when the second frame members 12 are disengaged from the first frame member 10, the contact elements 19a and 19b are inclined slightly towards each other as viewed in plan. On the other hand, the contact elements 19a and 19b are caused to flex away from each other when the second frame members 12 are assembled with the first frame member 10. With this arrangement, moderate variations in dimensions of the components of the frame assembly can be tolerated without resulting in instability of the completed assembly.

Dis-connection of the joint construction is performed by reversing the operation hereinbefore described for assembly of the joint construction.

The uppermost tongue elements 23a is hook-shaped in an upwardly facing direction in order to ensure that the joint construction is not dis-connected in the event of the beam 11 being accidentally raised by, for example, the forks of a lift truck which is intended to lift a load supported on the beam 11. If the second frame members 12 are raised so that the lower two tongue elements 23b are aligned with their respective slots 19, the second frame members 12 cannot be withdrawn forwardly from the first frame members 10 by reason of the upwardly projecting part of the upper tongue element 23a engaging with the first frame member.

The recesses 25 in the upper surfaces of the tongue elements 23a and 23b are also provided to help prevent accidental dis-engagement of the second frame members 12 from the first frame members 10 by upward movement of the beam 11 such as may occur in pallet rack assemblies if the tines of a fork lift truck are accidentally engaged beneath a beam.

The first frame members 10 are typically of 12 gauge material and have a base width of 3 inches and a side limb width of 1½ inches. The re-entrant trough-shaped recess 16 is typically 0.75 inches wide and 0.6 inches deep. The second frame member 12 is typically of 8 gauge material, is 6.75 inches high and has an internal face width slightly greater than the distance separating the respective surfaces of a side limb 14 and limb 18 of the first frame member 10 which are contacted by the second frame member 12 in use.

What I claim then is:

1. A joint construction for connecting together two frame members wherein:
   a. a first of said frame members has opposite side limbs connected by a base so that the side limbs and base collectively define a trough-like shape,
   b. said first frame member base having formed therein a re-entrant trough-shaped recess which extends longitudinally of the first frame member,
   c. said recess including a base having a plurality of slots spaced longitudinally along the recess thereof, and contact elements disposed at the margins of the slots and projecting from the recess base in a direction away from a mouth of a re-entrant trough-shaped recess,
   d. the second of said frame members being of trough-shape and having a limb which comprises a plurality of hook-shaped tongue elements spaced longitudinally from one another,
   e. said slots in the base of the re-entrant trough-shaped recess have mutually-inclined lateral margins so that each slot is wider at one end than at the other end thereof, said contact elements are similarly mutually inclined,
   f. at least one of the tongue elements of the second frame member is inclined to a longitudinal axis of the second frame member,
   g. the second trough-shaped frame member having an effective size to embrace the outer surface of one side limb, a part of the base of the first frame member and one side of the re-entrant trough-shaped recess formed therein,
   h. said tongue elements are engaged in said slots with one of the tongue elements being in face-to-face wedging engagement with a respective one of said contact elements, i. said wedging engagement being effective to hold the second frame member firmly in contact with the outer surface of said one side limb of the first frame member and to support the second frame member against downward movement relative to the first frame member.

2. A joint construction according to claim 1 wherein the contact elements at opposite margins of each slot are convergent in a direction away from the mouth of the re-entrant trough-shaped recess and are deflectable to a mutually-parallel relation by engagement with respective tongue elements whereby said wedging engagement is enhanced.

* * * * *